(12) United States Patent
Bouchez

(10) Patent No.: US 8,721,480 B2
(45) Date of Patent: May 13, 2014

(54) BICYCLE CRANKSET WITH TWO CHAINRINGS

(75) Inventor: Julien Bouchez, Saint Germain des Pres (FR)

(73) Assignee: Look Cycle International, Nevers (FR)

( * ) Notice: Subject to any disclaimer, the term of this patent is extended or adjusted under 35 U.S.C. 154(b) by 726 days.

(21) Appl. No.: 12/034,003

(22) Filed: Feb. 20, 2008

(65) Prior Publication Data

US 2008/0207369 A1 Aug. 28, 2008

(30) Foreign Application Priority Data

Feb. 23, 2007 (FR) ...................................... 07 01320

(51) Int. Cl.
*F16H 55/12* (2006.01)

(52) U.S. Cl.
USPC ......................................................... 474/162

(58) Field of Classification Search
USPC ................. 474/148, 152, 160, 164, 158, 162; 74/594.1, 594.2; 280/260, 261
See application file for complete search history.

(56) References Cited

U.S. PATENT DOCUMENTS

| 4,144,773 | A | | 3/1979 | Addicks | |
|---|---|---|---|---|---|
| 4,259,880 | A | * | 4/1981 | Ueno | 74/594.2 |
| 4,741,724 | A | * | 5/1988 | Wang | 474/160 |
| 5,213,550 | A | | 5/1993 | Wu | |
| 5,314,366 | A | * | 5/1994 | Palm | 474/152 |
| D356,526 | S | * | 3/1995 | Burns | D12/123 |
| 6,024,662 | A | * | 2/2000 | Fujimoto | 474/144 |
| 6,431,301 | B1 | * | 8/2002 | Forbes | 180/185 |
| 7,503,864 | B2 | * | 3/2009 | Nonoshita et al. | 474/160 |
| 7,824,287 | B2 | * | 11/2010 | Nonoshita et al. | 474/161 |
| 2004/0121867 | A1 | * | 6/2004 | Reiter | 474/160 |
| 2006/0094550 | A1 | * | 5/2006 | Tetsuka | 474/160 |
| 2006/0128512 | A1 | * | 6/2006 | Tetsuka et al. | 474/160 |
| 2008/0161146 | A1 | * | 7/2008 | Shiraishi et al. | 474/160 |

FOREIGN PATENT DOCUMENTS

DE 892 561 C 10/1953

OTHER PUBLICATIONS

French Search Report of 0701320 filed Feb. 23, 2007.

* cited by examiner

*Primary Examiner* — William A Rivera
(74) *Attorney, Agent, or Firm* — Young & Thompson

(57) ABSTRACT

The bicycle crankset includes a bottom bracket axle, two cranks and a chainring carrier bearing first and second different toothed chainrings. The chainring carrier has the shape of a star, of which each arm is provided with a mounting hole aligned with a mounting hole in the first and second chainrings respectively. These holes accommodate elements for fastening chainrings to the chainring carrier, and they are arranged on a first circle with a predetermined diameter. Each arm of the chainring carrier is provided with a second mounting hole arranged on a second circle with a diameter that has been reduced relative to the first circle to match the chainring carrier to two other toothed circular chainrings with a size that is respectively reduced relative to the first and second chainrings and of which the mounting holes are located on the second circle.

8 Claims, 3 Drawing Sheets

BICYCLE CRANKSET WITH TWO CHAINRINGS

BACKGROUND OF THE INVENTION

This invention relates to the crankset of a bicycle. It likewise relates to a bicycle equipped with a crankset according to the invention.

The invention relates especially to the crankset of a bicycle with two chainrings, i.e., it comprises one chainring called the large chainring that makes it possible to obtain a large number of gear inches for using the bicycle riding downhill or on flat ground, and a chainring called the small chainring with reduced toothing relative to the large chainring, which makes it possible to ascend hills more easily or to start off more easily.

DESCRIPTION OF THE RELATED ART

The bicycle crankset with two chainrings first appeared on racing bicycles, and subsequently its use became common on touring bicycles.

Any bicycle crankset of this type comprises a bottom bracket axle, two cranks connected to opposite ends of this bottom bracket axle and extending in the opposite direction to one another, as well as a chainring carrier bearing first and second toothed circular chainrings of different diameters that are able to work at the same time with a bicycle drive chain. This chainring carrier is provided with a central hole that accommodates the bottom bracket axle that is made to co-rotate with the chainring carrier.

The first and second chainrings are generally joined to the right crank of the crankset and are mounted in a removable manner relative to the latter. In this way, the chainrings can be replaced when worn, but also when the user wishes to modify his gear inches by using different toothing.

In order to allow easy and exact installation of the first and second chainrings, the chainring carrier has the shape of a star with uniformly spaced arms, each arm being provided near its free end with a mounting hole that accommodates a means of fastening the chainrings to the chainring carrier. These mounting holes are arranged on a circle with a predetermined diameter and are centered on the central hole of the chainring carrier. Each mounting hole is aligned with a mounting hole provided in the first and second chainrings respectively.

The diameter of this circle is matched to the ends of the arms in order to allow free passage of the chain around the chainring of reduced size.

This known chainring carrier is provided with two raised circular bearing surfaces on either side of the carrier that correspond to this circle. One of the bearing surfaces is located on the outside of the bicycle near the right crank, and the other bearing surface is located on the inside nearer the bicycle frame. These bearing surfaces allow rigid attachment of the chainrings on either side of the chainring carrier using fasteners that traverse the aligned mounting holes provided on the chainrings and on the chainring carrier.

A very common chainring carrier that has become standard consists of a five-pointed star, of which the circular bearing surface with the mounting holes has a diameter of 130 mm. Thus, the rider can install original equipment chainrings, but also chainrings that have been made compatible and that are provided by other specialized suppliers.

At this point, to ascend very steep inclines, chainrings of even smaller size are sometimes necessary or at least preferable to limit the exertion and the fatigue of the rider.

To solve this problem, one approach consists in providing three chainrings; this, however, entails greater bulk and weight, as well as more complex gear management. These chainrings, moreover, require use of special derailleurs, both front and back. Another disadvantage is that this crankset requires a longer bottom bracket axle.

A more recent development started by the advent of smaller and smaller rear cogs led to the suggestion of another type of crankset with two chainrings, with smaller toothing, to make climbing easier. This type of crankset is called compact due to the smaller bulk of the entire assembly. These cranksets, however, are sometimes neither suitable nor efficient for use in moderate terrain, the gears to be used on flat ground leading to a major crossing of the chain that is then working under poor conditions.

These chainrings allow some wear, under the condition that the cranks are changed. In fact, the reduced dimensions of these chainrings, in this case the small chainring, do not allow attachment of the chainrings to a chainring carrier with a diameter of 130 mm corresponding to the standard. A specific size of a 110 mm diameter of the mounting circle on the chainring carrier has thus been adopted for this type of crankset.

SUMMARY OF THE INVENTION

The purpose of the invention is to eliminate the aforementioned disadvantages by suggesting a crankset provided with a multipurpose chainring carrier that makes it possible to match so-called standard chainrings and so-called compact chainrings equally well.

The object of the invention is a bicycle crankset comprising a bottom bracket axle, two cranks attached to opposite ends of said bottom bracket axle, a chainring carrier provided with a central hole for accommodating said bottom bracket axle and bearing first and second circular toothed chainrings of different sizes, said chainring carrier having the shape of a star with uniformly spaced arms, each arm being provided near its free end with a mounting hole aligned with a mounting hole provided in said first and second chainrings respectively, said aligned mounting holes accommodating a means of fastening said chainrings to said chainring carrier, said mounting holes being arranged on a first circle with a predetermined diameter and centered on said central hole, characterized by the fact that each arm of the chainring carrier is provided with a second mounting hole arranged on a second circle that is concentric to said first circle and having a diameter that has been reduced relative to that of said first circle so as to match the chainring carrier to the other two toothed circular chainrings with a size that is respectively reduced relative to that of said first and second chainrings, and of which the mounting holes are located on said second circle.

According to other characteristics of the invention:
- each arm of said chainring carrier is defined by the two lateral sides that are essentially parallel to one another and connected by an end side;
- said end side is oblique relative to said lateral sides;
- said first hole and said second hole of each arm are aligned to one another parallel to said end side;
- said second chainring is connected to said chainring carrier via said first chainring;
- said chainring carrier is located outside said first and second chainrings;
- crosspieces are arranged uniformly between said first and second chainrings;
- said crosspieces are composed of washers connected to said fasteners;

said first and second chainrings are so-called standard chainrings and said other chainrings of reduced size are so-called compact chainrings;

said first circle corresponds to said so-called standard chainrings and has a diameter of roughly 130 mm, whereas said second circle corresponds to said so-called compact chainrings and has a diameter of roughly 110 mm.

The object of the invention is likewise a bicycle comprising a bicycle crankset with one or more of the aforementioned characteristics.

BRIEF DESCRIPTION OF THE DRAWINGS

Other characteristics and advantages of the invention will become apparent from the following description of one non-restrictive embodiment of the invention with reference to the attached figures, in which.

In the figures, identical or equivalent components will bear the same reference numbers.

DESCRIPTION OF THE PREFERRED EMBODIMENTS

Figure 1:
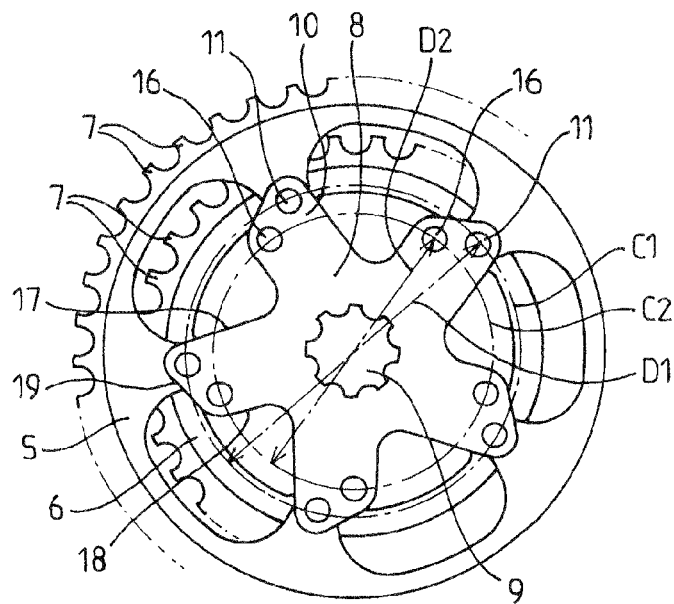
FIG. 1 is a schematic front view showing a chainring carrier bearing first and second so-called standard chainrings.

The crankset of the bicycle 1 (see FIG. 5) comprises a bottom bracket axle 2 that is connected on its opposite ends to a right crank 3 and to a left crank 4 respectively extending in opposite directions. The cranks 3 and 4 can mount a right pedal and left pedal (not shown) respectively on their ends.

The bicycle crankset according to the invention is in particular a crankset of the double chainring type, namely a first toothed chainring 5 and a second toothed chainring 6 with a different diameter, the first chainring 5 being larger than the second chainring 6. The teeth 7 of the first and second chainrings 5, 6 are able to work with a drive chain (not shown) that in turn drives the rear wheel (not shown) of a bicycle in rotation.

The first and second chainrings 5, 6 are mounted on a chainring carrier 8 that is provided with a central hole 9 that accommodates the bottom bracket axle 2 that co-rotates with the chainring carrier 8 by positive engagement.

The chainring carrier 8 has the shape of a star with arms 10 that are uniformly spaced. Each arm 10 on its end is provided with a first mounting hole 11 aligned with the respective mounting hole (see FIGS. 6 and 7) provided in the first chainring 5 and on the respective mounting hole 13 provided in the second chainring 6.

All the mounting holes 11, 12, and 13 are arranged on a first circle C1 (see FIG. 1) with a predetermined diameter D1 that is centered on the central hole 9 of the chainring carrier 8. This first circle C1 as shown in FIGS. 1 and 2 corresponds to so-called standard chainrings and has a diameter of roughly 130 mm.

Three mounting holes 11, 12 and 13, when aligned each time, accommodate a fastening means composed of a screw 14 and of a flared nut 15 that are arranged on either side of the assembly composed of the chainring carrier 8 and the first and second chainrings 5, 6 that are preferably tacked such that they form crowns comprising—on their interior periphery—projections in which the respective mounting holes 12, 13 are arranged, as is illustrated in the figures.

Figure 2:
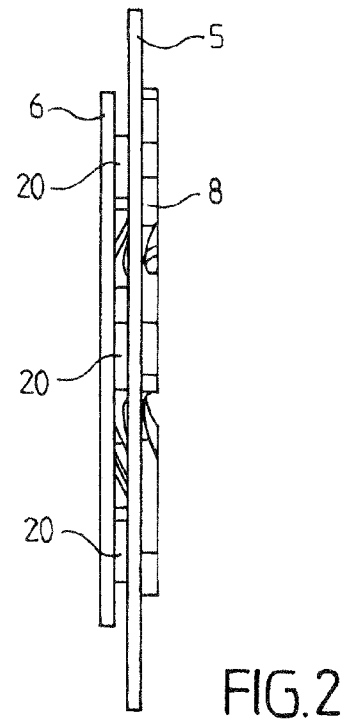
FIG. 2 is a top view of the assembly shown in FIG. 1.

According to one characteristic of the invention, each arm 10 of the chainring carrier 8 is provided with a second mounting hole arranged on a second circle C2 that is concentric with the first circle C1 and that has a diameter D2 that is reduced relative to that of the first circle C1 so as to adapt the chainring carrier 8 to the other two toothed chainrings 5', 6' (see FIG. 3) with a size that is respectively reduced relative to that of the first and second chainrings 5, 6 shown in FIG. 1. This second circle C2 as shown in FIGS. 1 and 2 corresponds to so-called compact chainrings and has a diameter of roughly 110 mm.

Figure 3:
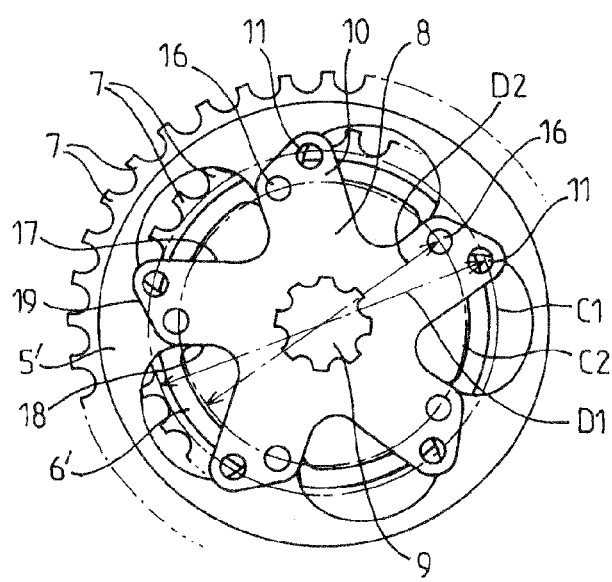
FIG. 3 is a schematic front view showing a chainring carrier bearing first and second so-called compact chainrings.
Figure 4:
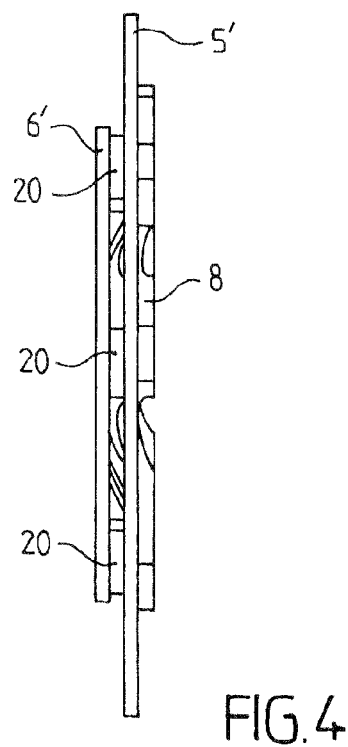
FIG. 4 is a top view of the assembly shown in FIG. 3.

Each arm 10 of the chainring carrier 8 is defined by two lateral sides 17, 18 essentially parallel to one another and connected by an end side 19 (see FIGS. 1 and 3). To facilitate assembly with the chain, the end side 19 is preferably oblique relative to the lateral sides 17, 18.

The first mounting hole 11 and the second mounting hole 16 of each arm 10 are preferably aligned to one another in parallel to the end side 19 of the arm 10.

In order to prevent the drive chain (not shown) from interfering with the chainring carrier 8 when it engages with the smaller (6') of the so-called compact chainrings 5', 6', it is preferable to place the chainrings 5', 6', and consequently also 5, 6, on only one side of the chainring carrier 8, i.e., the second chainring 6, 6' is connected to the chainring carrier 8 via the first chainring 5, 5'.

Figure 5:
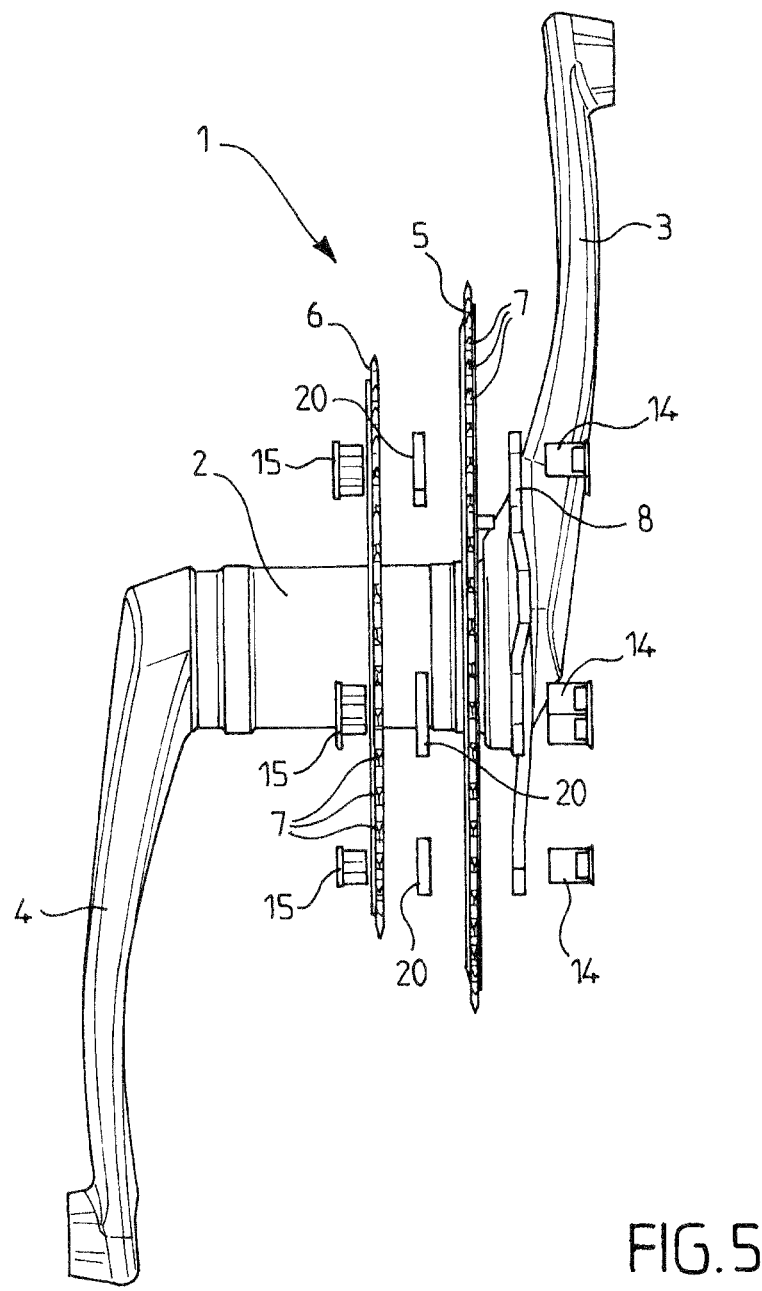
FIG. 5 is an exploded top view showing a bicycle crankset according to the invention.
Figure 6:
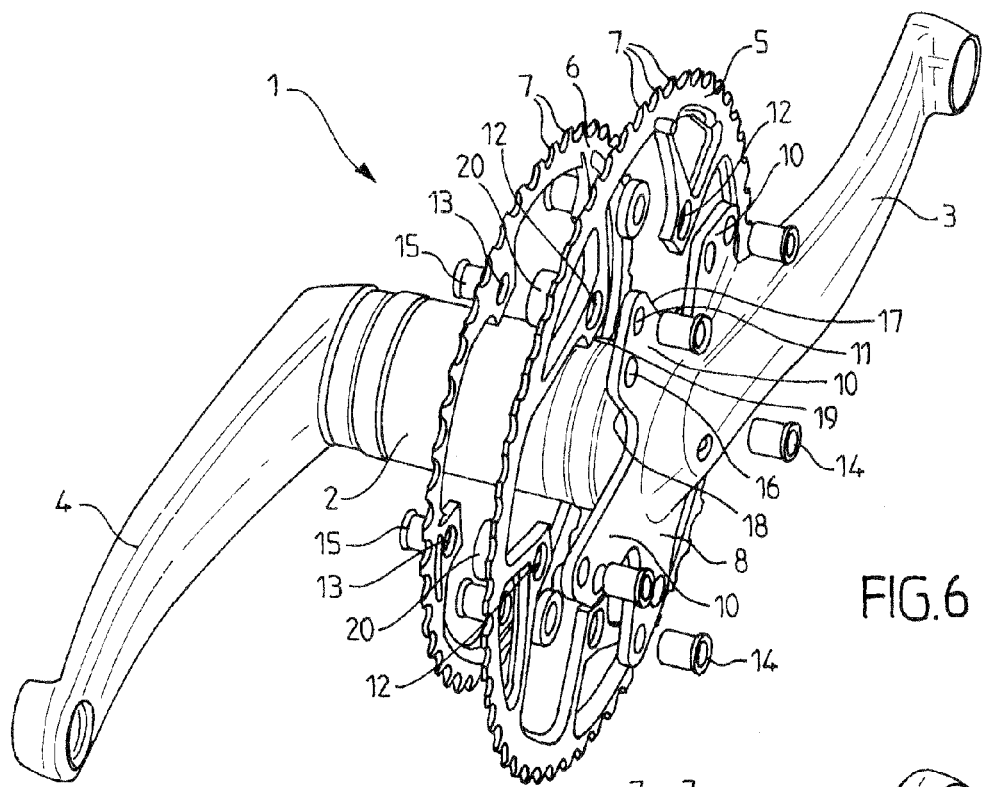
FIGS. 6 and 7 are perspective exploded views showing all the components of the crankset from FIG. 5.
Figure 7:
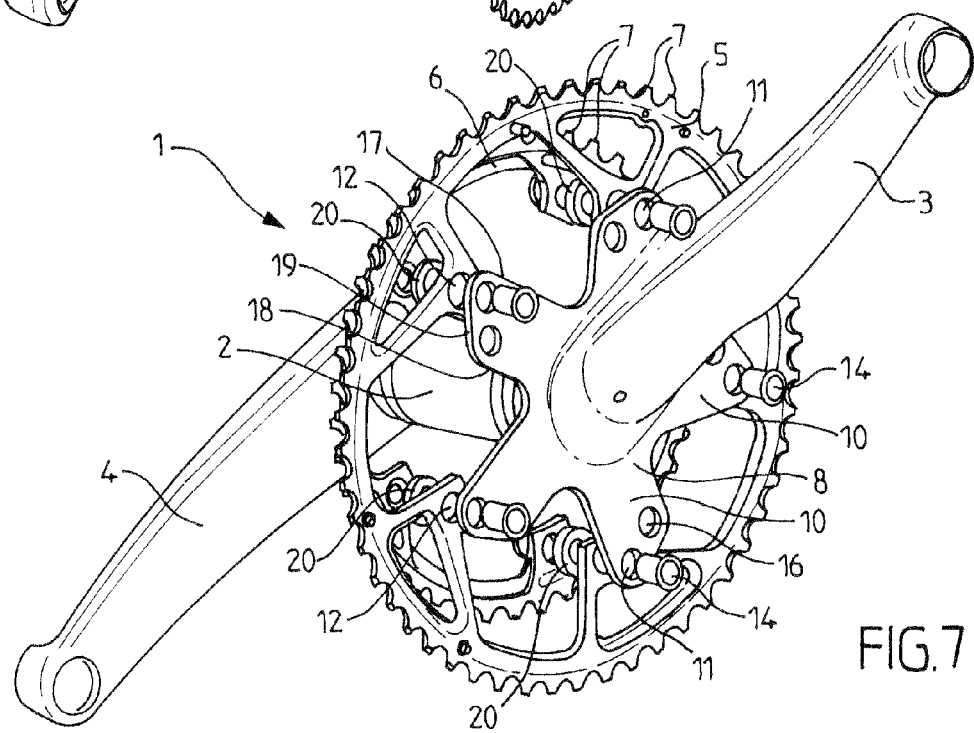

Preferably, the chainring carrier 8 is arranged outside the first and second chainrings 5, 6 or 5', 6' that are thus located farther from the right crank 3 (see FIGS. 5 to 7).

In order to maintain the necessary spacing between the first and the second chainrings 5, 6 (5', 6'), crosspieces 20 are arranged uniformly between them.

Preferably, the crosspieces 20 are composed of washers joined to the fasteners 14, 15. More exactly, the washers are threaded onto the stems of the corresponding screws 14.

Thus, according to the invention, it is possible to replace the first and second chainrings 5, 6 that are so-called standard chainrings by the first and second chainrings 5', 6' that are so-called compact chainrings while using the same chainring carrier 8 that thus becomes a multipurpose chainring carrier.

Of course, the invention is not limited to the illustrated and described examples, but can be applied to a bicycle crankset comprising a larger number of chainrings.

The invention claimed is:

1. Bicycle crankset comprising:

a bottom bracket axle (2) with two opposite ends;

two cranks, each of said cranks attached to a respective one of the opposite ends of said bottom bracket axle;

first and second circular toothed chainrings (5, 6) of different sizes, aligned mounting holes (12, 13) provided in said first and second chainrings (5, 6) respectively;

a chainring carrier (8) provided with a central hole (9) for accommodating said bottom bracket axle (2) and bearing the first and second chainrings (5, 6), said chainring carrier (8) having the shape of a star with uniformly spaced arms (10), each arm (10) have a free end and being provided near the free end with a first mounting hole (11) aligned with said aligned mounting holes (12, 13) of said first and second chainrings (5, 6) respectively; and fastening means (14, 15) that extend through said first mounting hole (11) of each arm and, at the same time, through said aligned mounting holes (12, 13) of both of said first and second chainrings (5, 6) such that each fastening means (14, 15) thereby fastens both said first and second circular toothed chainrings (5,6) to said chainring carrier (8), wherein, said first mounting hole of each arm (11) and said aligned mounting holes (12, 13) of said first and second chainrings (5, 6) are arranged on a first circle (C1) with a predetermined diameter (D1) and centered on said central hole (9) of the chainring carrier, and wherein each arm (10) of the chainring carrier (8) is further provided with a second mounting hole (16) which is disposed on a second circle (C2) that is concentric relative to said first circle (C1) and having a diameter (D2) that is reduced relative to the diameter (D1) of said first circle (C1), wherein said second mounting hole (16) of said arms (10) enables replacement of said first and second chainrings (5, 6) by two other first and second circular toothed chainrings (5', 6') being compact chainrings with a size that is respectively reduced relative to a size of said first and second chainrings (5, 6), and with mounting holes (12, 13) located on said second circle (C2), thus obtaining a multipurpose chainring carrier (8), and wherein, each arm of said chainring carrier (8) extends substantially radially, each arm (10) of said chainring carrier (8) is defined by two lateral sides (17, 18) that are essentially parallel to one another and connected by an end side (19), and said end side (19) is oblique relative to said lateral sides (17, 18), and said first mounting hole and said second mounting hole of each arm are aligned to one another parallel to said end side.

2. Component parts for a bicycle crankset according to claim 1, wherein,
said first circle (C1) has a diameter of 130 mm, and
said second circle (C2) has a diameter of 110 mm.

3. Bicycle crankset according to claim 1, wherein,
said fastening means including crosspieces adapted for being arranged uniformly between the first and second circular toothed chainrings (5, 6).

4. Bicycle crankset according to claim 3, wherein said crosspieces (20) are composed of washers.

5. Bicycle crankset according to claim 3, wherein said first circle (C1) has a diameter of about 130 mm.

6. Bicycle crankset according to claim 5, wherein said second circle (C2) has a diameter of about 110 mm.

7. Bicycle crankset according to claim 1, wherein said chainring carrier (8) is located outside said first and second chainrings (5, 6).

8. Bicycle crankset according to claim 1, wherein, each said fastening means includes a screw (14) engaged with a flared nut (15) that are arranged on either side of an assembly composed of the chainring carrier (8) and the first and second chainrings (5, 6), with the screw (14) and the flared nut (15) fastening both said first and second circular toothed chainrings (5,6) to said chainring carrier (8) through a single one of said first mounting holes.

\* \* \* \* \*